(12) United States Patent
Yamagishi (10) Patent No.: US 7,394,477 B2
(45) Date of Patent: Jul. 1, 2008

(54) IMAGE FORMATION APPARATUS

(75) Inventor: Kenichi Yamagishi, Kanagawa (JP)

(73) Assignee: Fujifilm Corporation, Tokyo (JP)

(*) Notice: Subject to any disclaimer, the term of this patent is extended or adjusted under 35 U.S.C. 154(b) by 294 days.

(21) Appl. No.: 11/092,678

(22) Filed: Mar. 30, 2005

(65) Prior Publication Data

US 2005/0219352 A1 Oct. 6, 2005

(30) Foreign Application Priority Data

Mar. 30, 2004 (JP) ............................ 2004-097470

(51) Int. Cl.
*B41J 2/47* (2006.01)

(52) U.S. Cl. .................. 347/235; 347/247; 347/248

(58) Field of Classification Search .............. 347/235, 347/247, 248, 204; 359/204
See application file for complete search history.

(56) References Cited

U.S. PATENT DOCUMENTS 5,124,829 A * 6/1992 Ishikawa .................. 359/204
6,191,803 B1 * 2/2001 Kamioka .................. 347/235

FOREIGN PATENT DOCUMENTS

| JP | 5-107649 A | 4/1993 |
|----|------------|--------|
| JP | 9-292820 A | 11/1997 |
| JP | 11-249534 A | 9/1999 |

* cited by examiner

*Primary Examiner*—Lam S Nguyen
(74) *Attorney, Agent, or Firm*—Sughrue Mion, PLLC (57) ABSTRACT

An image formation apparatus comprises an optical flat including: a cabinet; and a scanning optical system containing a light deflection section, the scanning optical system being housed inside the cabinet, so as to emit light scanned by the light deflection section and form an image by the scanned light, wherein the image formation apparatus further comprises a heating section being placed on an outer side of the cabinet to heat the optical flat.

2 Claims, 6 Drawing Sheets

IMAGE FORMATION APPARATUS

BACKGROUND OF THE INVENTION

1. Field of the Invention

This invention relates to an image formation apparatus and in particular to an art for preventing condensation from occurring in an image formation apparatus and stably forming an image.

2. Description of the Related Art

Hitherto, an optical flat (photo scanner) for deflecting and reflecting a light beam emitted from a light source by a deflector such as a polygon mirror and scanning the light beam over the record face of a thermal development record material for recording an image has been installed in a thermal development record apparatus or an image formation apparatus such as a copier or a laser printer.

As this kind of optical flat, an apparatus using a semiconductor laser or a laser diode (LD) as a light source is known.

By the way, in a machine used in an environment in which air-conditioning facilities are not complete, for example, a medical image record apparatus (thermal development record apparatus), etc., installed in a vehicle, when it rains at high humidity or in a state in which the medical image record apparatus is cooled in the nighttime, if the ambient temperature rapidly rises because of starting up the machine, the dew-point temperature is reached and there is a possibility that condensation may occur in image formation apparatus. If condensation occurs in an optical system of a lens, a mirror, etc., forming a part of the image formation apparatus, a mark is left as a pattern in the optical system of the lens, the mirror, etc., still after the condensation is removed by drying water droplets, and the later formed image is adversely affected. Thus, once condensation occurs, the image formation apparatus must be cleaned; the image formation apparatus needs to be disassembled for cleaning in some cases.

Therefore, measures against condensation need to be taken at least for the optical system. Hitherto, image read machines have undergone dehumidification by a dehumidifier. However, installation of a dehumidifier causes an increase in the cost and the installation space of the dehumidifier is required, making it hard to compact the image formation apparatus; this is a problem. As other arts concerning condensation prevention, those for installing a thermal insulation heater or a fan are known (for example, JP-A-11-249534 (pages 3-5, FIG. 1), JP-A-5-107649 (pages 2-3, FIG. 1) and JP-A-9-292820 (pages 2-3, FIG. 1)).

An image formation apparatus disclosed in JP-A-11-249534 (pages 3-5, FIG. 1) includes a water droplet detection sensor, a thermal insulation heater, and a fan and when the water droplet detection sensor detects condensation, the fan is stopped to stop taking in outside air and the thermal insulation heater is turned on for heating and drying water droplets. However, in the image formation apparatus, after condensation occurs, the operation is started for drying water droplets or preventing furthermore progress of the condensation; initial occurrence of condensation cannot be prevented and the measures are not sufficient as the measures against condensation.

An image formation apparatus disclosed in JP-A-5-107649 (pages 2-3, FIG. 1) includes a thermal insulation heater in the proximity of a standby position of an optical system unit of a lens, etc., and after the optical system unit is moved to the standby position, the thermal insulation heater is turned on for heating and preventing condensation. Further, in an image formation apparatus disclosed in JP-A-9-292820 (pages 2-3, FIG. 1), when the image formation apparatus is started up, a fan is stopped to stop taking in outside air for a given time until the internal temperature rises, thereby preventing condensation. In the image formation apparatus disclosed in JP-A-5-107649 (pages 2-3, FIG. 1) or JP-A-9-292820 (pages 2-3, FIG. 1), particularly condensation in any other part than the standby position cannot be prevented and not only it takes a long time to start up the image formation apparatus, but also it is difficult to reliably avoid condensation.

SUMMARY OF THE INVENTION

It is therefore an object of the invention to provide an image formation apparatus for reliably preventing condensation in an optical flat and forming a good image, the image formation apparatus that can be started up in a short time.

The object of the invention is accomplished by the following configurations:

(1) An image formation apparatus which comprises an optical flat including: a cabinet; and a scanning optical system containing a light deflection section, the scanning optical system being housed inside the cabinet, so as to emit light scanned by the light deflection section and form an image by the scanned light, wherein the image formation apparatus further comprises a heating section being placed on an outer side of the cabinet to heat the optical flat.

According to the image formation apparatus, the heating section for heating the optical flat is placed on the outer side of the cabinet, so that the scanning optical system containing the light deflection section is heated for preventing condensation in the scanning optical system and at the same time, air in the image formation apparatus is warmed for contributing to heating other parts (for example, thermal developing section), and it is made possible to start up the image formation apparatus in a short time.

(2) The image formation apparatus as described in (1), wherein the heating section is placed on an outer side at a position where the light deflection section is placed in the cabinet, so as to heat the light deflection section.

According to the image formation apparatus, the heating section for heating the light deflection section is placed on the outer side at a position where the light deflection section is placed in the cabinet. Thus, first, while the light deflection section is heated by the heating section for preventing condensation, the image formation apparatus is started up and other parts are heated by heat generated from the light deflection section, so that condensation in the optical flat can be prevented. It is not necessary to wait until the whole temperature of the image formation apparatus rises and consequently the image formation apparatus can be started up in a short time. Further, when the image formation apparatus operates, the heat generated from the light deflection section can be radiated to the outside through the heating section for preventing an excessive rise in the temperature in the cabinet.

(3) The image formation apparatus as described in (1) or (2), wherein the optical flat further comprises: a light emission section that emits scan light from the scanning optical system to an outside of the cabinet; and a shutter by which the light emission section can be opened and closed.

According to the image formation apparatus, the light emission section for emitting scan light from the scanning optical system to the outside of the cabinet is covered with a shutter so that it can be opened and closed by the shutter. Thus, usually the shutter can be closed, thereby preventing a foreign material entering the optical flat from the outside and protecting the scanning optical system containing the light deflection section for forming a good image.

(4) The image formation apparatus as described in (3), wherein when the shutter is closed, the shutter hermetically seals an inside of the cabinet.

According to the image formation apparatus, if the shutter is closed, it hermetically seals the inside of the cabinet, so that the hermetically sealed optical flat is heated, whereby the inside of the cabinet can be warmed efficiently, condensation can be prevented reliably, and the image formation apparatus can be started up in a short time.

(5) The image formation apparatus as described in any one of (1) to (4), further comprising: a temperature sensor that measures the temperature in the cabinet; and a control section that operates the heating section to heat the optical flat when a temperature detection value of the temperature sensor is equal to or less than a first temperature.

According to the image formation apparatus, if the temperature in the cabinet is equal to or less than the predetermined temperature at which there is a fear of condensation, the optical flat can be heated by the heating section for reliably preventing condensation. (6) The image formation apparatus as described in any one of (3) to (5), further comprising: a temperature sensor that measures the temperature in the cabinet; and a control section that operates the shutter to be closed when a temperature detection value of the temperature sensor is equal to or less than a first temperature and operates the shutter to be opened when the temperature detection value is equal to or more than a second temperature, the second temperature being equal to or more than the first temperature.

According to the image formation apparatus, if the temperature in the cabinet is equal to or less than the predetermined temperature at which there is a fear of condensation, the shutter is closed for hermetically sealing the cabinet and then the optical flat is heated by the heating section. If the temperature in the cabinet exceeds the predetermined temperature, the shutter is opened, allowing the scan light from the scanning optical system to be emitted from the light emission section to the outside of the cabinet, and condensation in the optical flat can be prevented and the effect of condensation of the light emission section can be eliminated for forming a stable image.

DETAILED DESCRIPTION OF THE INVENTION

A preferred embodiment of an image formation apparatus according to the invention will be discussed in detail with reference to the accompanying drawings.

Figure 1:
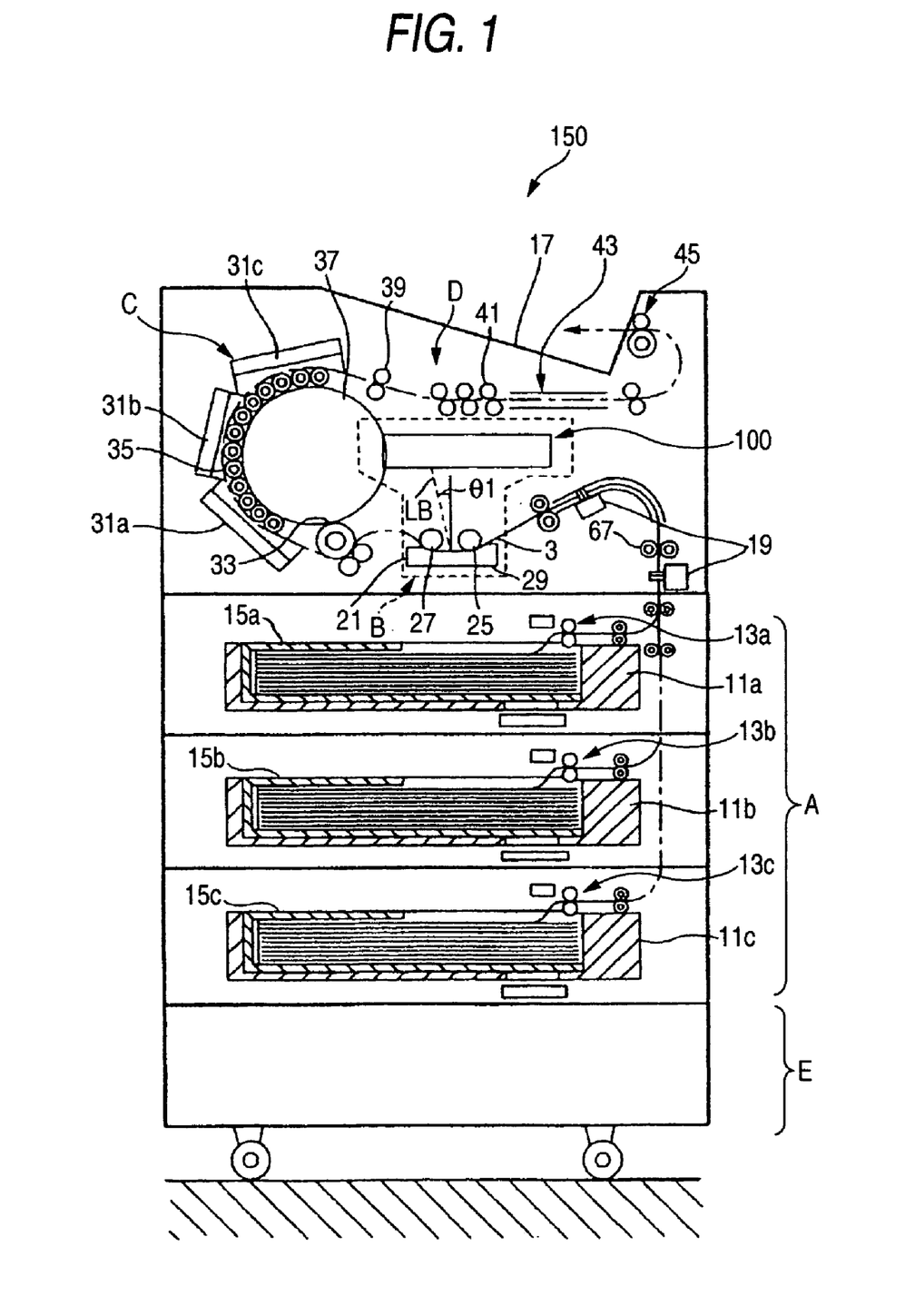
FIG. 1 is a drawing to show a schematic configuration of an image formation apparatus of the invention.
Figure 2:
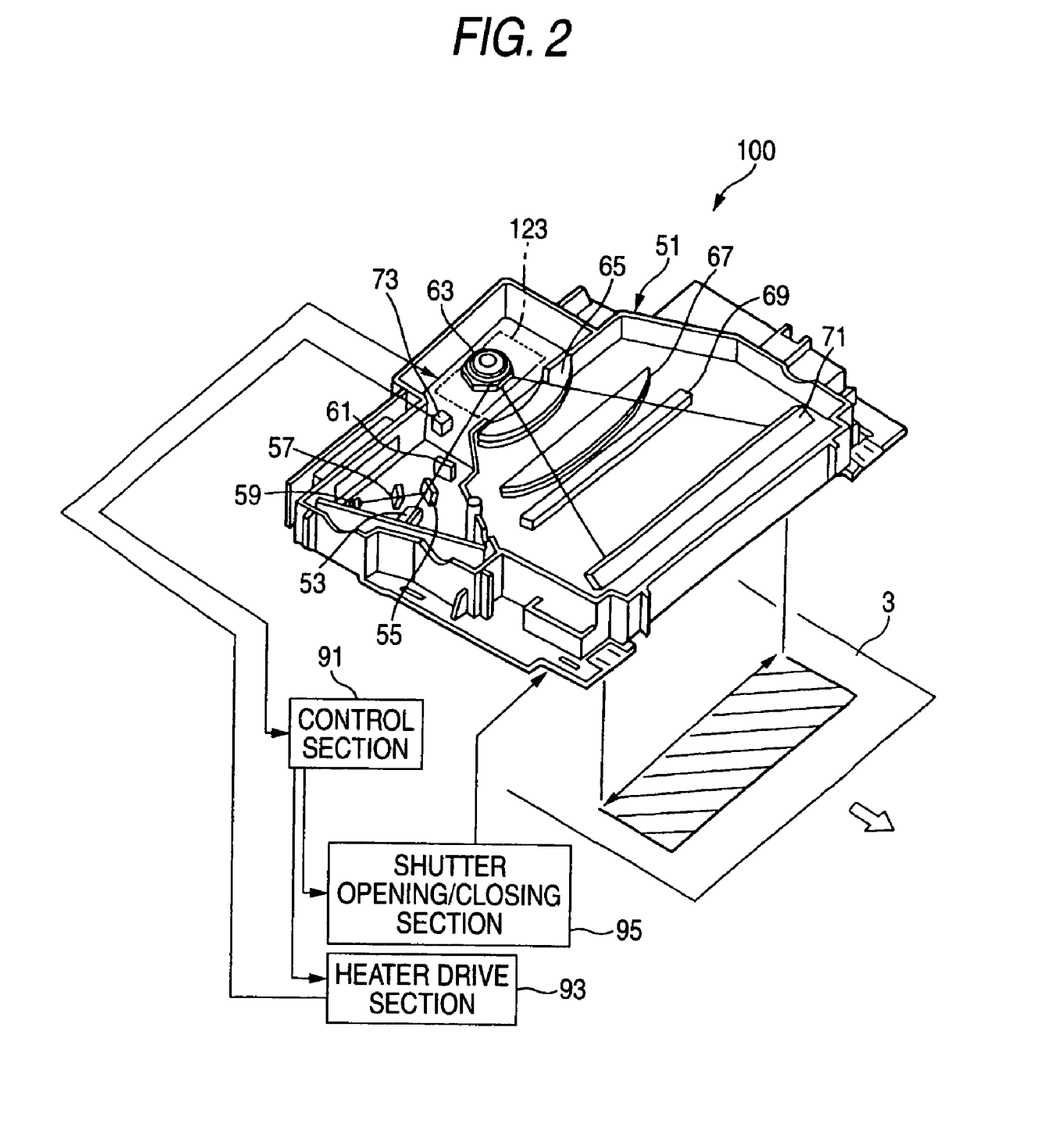
FIG. 2 is a drawing of a schematic configuration to show an image exposure section in FIG. 1 together with a control section.
Figure 3:
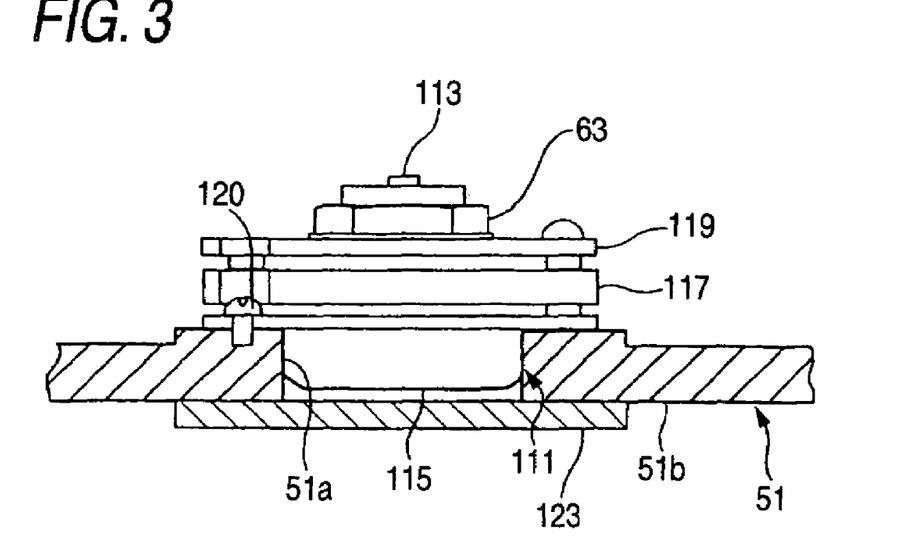
FIG. 3 is a longitudinal sectional view of a polygon mirror installed in a cabinet and a heating section placed below the polygon mirror.

FIG. 1 is a drawing to show a schematic configuration of an image formation apparatus of the invention, FIG. 2 is a drawing of a schematic configuration to show an image exposure section in FIG. 1 together with a control section, and FIG. 3 is a longitudinal sectional view of a heating section placed below a light deflection section.

An image formation apparatus 150 scans and exposes to light while modulating output light of an image exposure section based on an input image signal and forms a latent image on a thermal development record material and then performs a thermal development process of the thermal development record material for rendering the latent image visible.

To begin with, the general configuration of the image formation apparatus 150 will be discussed.

As shown in FIG. 1, the image formation apparatus 150 uses a thermal development record material made of a thermal development photosensitive material, a photosensitive heat-sensitive record material, etc., not requiring wet processing and exposes the thermal development photosensitive material to a light beam of laser light by scanning the light beam over the thermal development photosensitive material to form a latent image and then performs a thermal development process for providing a visible image and then is cooled to room temperature.

Therefore, the image formation apparatus 150 basically includes a thermal development record material supply section A, an image exposure section B., a thermal developing section C, and a cooling section D in order in the transport direction of the thermal development record material, and also includes a transport section being placed at important points between the sections for transporting the thermal development record material and a power supply/control section E for driving and controlling the sections.

In the image formation apparatus 150, the power supply/control section E is placed at the bottom, the thermal development record material supply section A is placed above the power supply/control section E, and the image exposure section B, the thermal developing section C, and the cooling section D are placed above the thermal development record material supply section A, and the image exposure section B and the thermal developing section C are made adjacent to each other.

According to the configuration, the exposure step and the thermal developing step can be executed within a short transport distance and the transport path length of the thermal development record material can be made the shortest for shortening the output time of one sheet. It is also made possible to simultaneously execute both the exposure step and the thermal developing step for one sheet of thermal development record material.

The thermal development photosensitive material, the photosensitive heat-sensitive record material, etc., described above can be used as the thermal development record material. The thermal development photosensitive material is a record material to record (expose to light) an image using a light beam (for example, a laser beam) and then perform thermal developing for color development. The photosensitive heat-sensitive record material is a record material to record an image using a light beam and then perform thermal developing for color development or develop color at the same time as recording an image by the heat mode (heat) of a laser beam and then fix by light application.

The thermal development record material supply section A is a section for taking out the thermal development record material one sheet at a time and supplying the thermal development record material to the image exposure section B positioned downstream in the transport direction of the thermal development record material, and is made up of three load sections 11a, 11b, and 11c, supply roller pairs 13a, 13b, and 13c placed in the load sections 11a, 11b, and 11c respectively, and a transport roller and a transport guide (not shown). Magazines 15a, 15b, and 15c storing different types of thermal development record materials (for example, B4 size, half-cut size, etc.,) are inserted into the three stages of the load sections 11a, 11b, and 11c, so that any of the sizes and orientations of the thermal development record materials loaded into the stages can be selectively used.

The thermal development record material is processed like a sheet and usually a deposition body (bundle) of a predetermined unit such as 150 sheets is packaged by a bag, a belt, etc., to form a package. Each package is stored in each magazine and is loaded into each stage of the thermal development record material supply section A.

The image exposure section B scans a light beam LB over the thermal development record material transported from the thermal development record material supply section A in a main scanning direction to expose the thermal development record material to the light beam and transports the thermal development record material in a subscanning direction roughly orthogonal to the main scanning direction (namely, in the transport direction), thereby recording any desired image on the thermal development record material to form a latent image.

The thermal developing section C performs heat-up processing to perform thermal processing while transporting the thermal development record material after the scanning and light exposure. The thermal development record material after the developing processing is cooled in the cooling section D and is carried out to an ejection tray 17.

A width approaching mechanism 19 is provided on a transport passage between the thermal development record material supply section A and the image exposure section B for supplying the thermal development record material transported from the thermal development record material supply section A to the image exposure section B in a state in which the edge part of the thermal development record material in the width direction thereof is aligned.

Next, the image exposure section B will be discussed in detail.

The image exposure section B is a section for scanning a light beam over a thermal development record material 3, thereby exposing the material to the light beam, and includes a subscanning transport section (subscanning section) 21 having a fluttering prevention mechanism for transporting the thermal development record material while preventing fluttering from the transport face of the thermal development record material and an optical flat (laser application section) 100. The optical flat 100 causes a laser to scan (in the main scanning direction) while controlling output of the laser in accordance with image data separately provided. At this time, the thermal development record material 3 is moved in the subscanning direction by the subscanning transport section 21. The optical flat 100 is described later in detail.

The subscanning transport section 21 includes two drive rollers 25 and 27 with an axis line placed roughly in parallel with a main scanning line of applied laser light with the main scanning line between, and a guide plate 29 being placed facing the drive rollers 25 and 27 for supporting the thermal development record material. The guide plate 29 bends the thermal development record material 3 inserted between the guide plate 29 and the drive rollers 25 and 27 along a part of the drive roller periphery on the outsides of the drive rollers placed side by side, and abuts and receives the elastic rebound force caused by the bending of the thermal development record material 3 between the drive rollers.

The bending causes elastic rebound force to occur on the thermal development record material. This elastic rebound force causes a predetermined frictional force to be produced between the thermal development record material 3 and the drive rollers 25 and 27, and a transport drive force is reliably transferred from the drive rollers 25 and 27 to the thermal development record material 3 for transporting the thermal development record material 3. Therefore, fluttering from the transport face of the thermal development record material 3, namely, fluttering in the up and down direction can be suppressed reliably. The laser light is applied to the thermal development record material 3 between the drive rollers, whereby good recording with no light exposure position shift can be accomplished.

The drive rollers 25 and 27 receive the drive force of drive means such as a motor (not shown) via a transmission section of a gear, a belt, etc., and rotate clockwise in FIG. 1. A handle (not shown) for rotating the drive rollers 25 and 27 is installed to take out the jammed thermal development record material 3 when a jam occurs in the image exposure section B.

Next, the thermal developing section C will be discussed.

The thermal developing section C heats a heat-treated thermal development record material of the type to which a heat treatment is applied and has a plurality of plate heaters 31a, 31b, and 31c arranged in the transport direction of thermal development record material as heating bodies reaching the necessary temperature for treating the thermal development record material 3, the plate heaters 31a, 31b, and 31c being bent and placed like a series of circular arcs.

That is, as the configuration of the thermal developing section C including the plate heaters 31a, 31b, and 31c, each plate heater is provided with a concave face and the thermal development record material 3 is slid while it is brought into contact with the concave faces of the plate heaters 31a, 31b, and 31c, and is relatively moved, as shown in the figure. As the transport section for transporting the thermal development record material 3 at this time, a supply roller 33 and a plurality of press rollers 35 for also transferring heat from the plate heaters 31a, 31b, and 31c to the thermal development record material 3 are disposed.

The press rollers 35 are rotated by a gear 37. According to the configuration, the thermal development record material 3 is transported while it is pressed against the plate heaters 31a, 31b, and 31c, so that buckling of the thermal development record material 3 is prevented. The press rollers 35 may abut a drum (not shown) and may be driven by rotation of the drum. Metal rollers, resin rollers, rubber rollers, etc., can be used as the press rollers 35.

An ejection roller 39 for transporting thermal development record material is disposed at the termination of the transport passage of the thermal development record material 3 in the thermal developing section C. The bent plate heaters described above are adopted by way of example and any other flat plate heater or a component using a heating drum and including an endless belt and a peeling claw may be used.

The thermal development record material 3 carried out from the thermal developing section C is cooled by the cooling section D while caution is used not to generate wrinkles and not to make a curl. The thermal development record material 3 ejected from the cooling section D is guided by a plurality of cooling roller pairs 41 provided at a midpoint in the transport passage into a guide plate 43 and further is ejected from an ejection roller pair 45 to the ejection tray 17.

Thus, the plurality of cooling roller pairs 41 are placed in the cooling section D so as to give any desired constant curvature R to the transport passage of the thermal development record material 3. This means that the thermal development record material 3 is transported at the constant curvature R until it is cooled below the glass transition point of the material. As curvature is thus intentionally given to the thermal development record material, a needless curl can be avoided before the material is cooled below the glass transition point, and if the material becomes below the glass transition point, a new curl is not made and variations in the curl amount do not occur.

The cooling rollers and the internal atmosphere of the cooling section D are temperature-adjusted. Such temperature adjustment is made, so that the state just after the heat treatment unit is started up and the state after it is sufficiently run can be made similar to each other as much as possible and density fluctuation can be lessened.

Image recording on the thermal development record material 3 is described in detail in International Patent Publication No. WO95/31754 and International Patent Publication No. WO95/30934, for example. Therefore, refer to them appropriately as required.

Next, the optical flat 100 forming the main part of the invention will be discussed in detail.

As shown in FIG. 2, the optical flat 100 is installed as a light source unit of an image record apparatus such as a thermal development record apparatus for recording an image on thermal development record material. The optical flat 100 has a cabinet 51 of an optical box molded of a synthetic resin in one piece, and an optical system described later is housed in the cabinet 51.

<Structure of Whole Optical System>

To begin with, the structure of the whole optical system housed in the cabinet 51 will be discussed.

A light source section 53 has a semiconductor laser or a laser diode (LD) and a collimating lens for converting a laser beam (light beam) emitted by the LD into a collimated beam. The laser beam as the collimated beam provided by the light source section 53 is applied to a beam splitter 55 and a part of the laser beam is reflected and the remainder passes through.

The partial laser beam reflected on the beam splitter 55 and taken out is gathered through a condensing lens 57 and is applied to a photo sensor 59 (PD) installed on a photo detector fixing board. The output voltage of the PD 59 receiving the beam light is compared with a reference voltage by an APC (Auto Power Control) circuit provided in a control section 91, and the current value into the LD of the light source section 53 is adjusted so that the output voltage of the PD 59 becomes constant relation with the reference voltage. Accordingly, the light strength of the laser beam from the LD is controlled so as to become constant at all times.

On the other hand, the laser beam passing through the beam splitter 55 passes through a cylindrical lens 61, is shaped, is applied to a polygon mirror 63 rotated at high speed, and is scanned consecutively in the main scanning direction. The laser beam deflected by the polygon mirror 63 passes through fθ lenses 65 and 67 and a cylindrical lens 69, is reflected downward on a cylindrical mirror 71, is emitted from a light emission section 81 (described later) to the outside of the cabinet 51, forms an image on thermal development record material 3, and is scanned.

The laser beam passing through the fθ lenses 65 and 67 and the cylindrical lens 69 from the polygon mirror 63 passes through a cylindrical lens (not shown) installed on one end side in the scanning direction, is applied to a parallel plate mirror (not shown), and is applied to a photo sensor (not shown) provided on an opposite end side in the scanning direction. That is, a timing signal is formed adopting the point in time at which the laser beam is received at the photo sensor at the rotating time of the polygon mirror 63 as a trigger of the image formation start in the main scanning.

A temperature sensor 73 is placed in the cabinet 51 for detecting the temperature in the cabinet 51 and transferring a detection signal to the control section 91. The control section 91 is connected to a heater drive section 93 electrically connected to a heating section 123 (described later) and a shutter opening/closing section 95 for opening and closing a shutter 83, and outputs a drive signal to the heater drive section 93 and the shutter opening/closing section 95 based on the temperature detection signal from the temperature sensor 73.

Next, the support structure of the polygon mirror 63 and placement of the heating section will be discussed.

Figure 4:
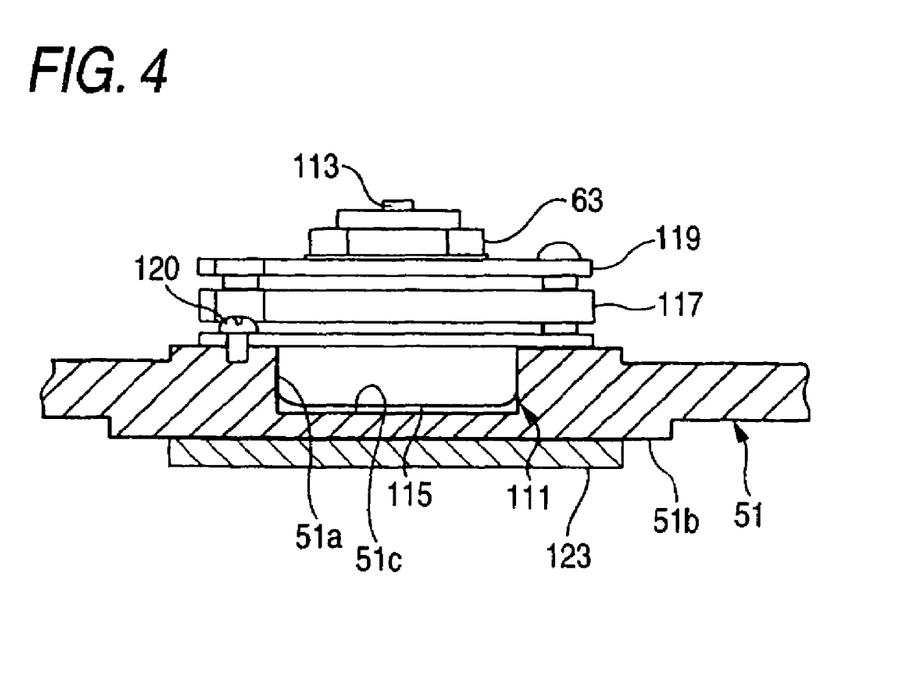
FIG. 4 is a longitudinal sectional view to show another installation example of the polygon mirror installed in the cabinet and the heating section placed below the polygon mirror.

FIG. 3 is a longitudinal sectional view of the polygon mirror installed in the cabinet and the heating section disposed below the polygon mirror, and FIG. 4 is a longitudinal sectional view to show another installation example of the polygon mirror installed in the cabinet and the heating section disposed below the polygon mirror.

The polygon mirror 63 is fixed to a rotation shaft 113 of a polygon mirror (not shown) provided in a drive section 111 and is rotated as the polygon mirror in the drive section 111 is driven for rotating the rotation shaft 113, as shown in FIG. 3. The rotation shaft 113 is supported by an air bearing (not shown) and can rotate smoothly with no rattle.

The drive section 111 has a case 115 shaped like a convex form circular in cross section in which the polygon mirror is housed, and a printed board 117 formed with a drive control circuit and a plate 119 are fixed in order above the case 115.

The cabinet 51 is formed with a through hole 51a molded integrally with the cabinet 51 inside the bottom. The drive section 111 of the polygon mirror 63 is fitted into the through hole 51a and is housed, whereby the outer periphery of the case 115 of the polygon mirror 63 is retained and is screwed by screws 119, whereby the drive section 111 is fixed to a predetermined position of the cabinet 51.

The heating section 123 such as a rubber heater is fixed to an outer side 51b of the cabinet 51 formed with the through hole 51a so as to block the outer side of the through hole 51a, whereby the heating section 123 is placed facing the drive section 111 of the polygon mirror 63. To fix the heating section 123, an appropriate fixing method of fixing the heating section 123 directly to the cabinet 51 by a screw, fixing the heating section 123 using a retention member fixed to the cabinet 51, or the like can be adopted.

The heater drive section 93 operates based on a drive command signal from the control section 91 and the heating section 123 is energized, thereby heating the polygon mirror 63 for preventing condensation. Heating the polygon mirror 63 also has the effect of circumventing a galling phenomenon easily occurring as an extremely small bearing gap of the air bearing for rotatably supporting the rotation shaft 113 becomes furthermore small at the low temperature time. At this time, the heat radiation from the face of the heating section 123 not opposed to the polygon mirror 63 acts so as to warm the outside of the optical flat 100, namely, the inside of the image formation apparatus 150.

In another installation example of the heating section, the drive section 111 of the polygon mirror 63 is fitted into a closed-end hole 51c made in the bottom of the cabinet 51 and is housed, whereby the drive section 111 is fixed to a predetermined position of the cabinet 51, as shown in FIG. 4. The heating section 123 is brought into intimate contact with an outer side 51b of the closed-end hole 51c and is fixed and heats the drive section 111 through the cabinet 51. Other parts are similar to those previously described with reference to FIG. 3 and therefore parts identical with those previously described with reference to FIG. 3 are denoted by the same or corresponding reference numerals in FIG. 4 and will not be discussed again.

Next, the shutter 83 will be discussed with reference to FIGS. 5 and 6.

Figure 5:
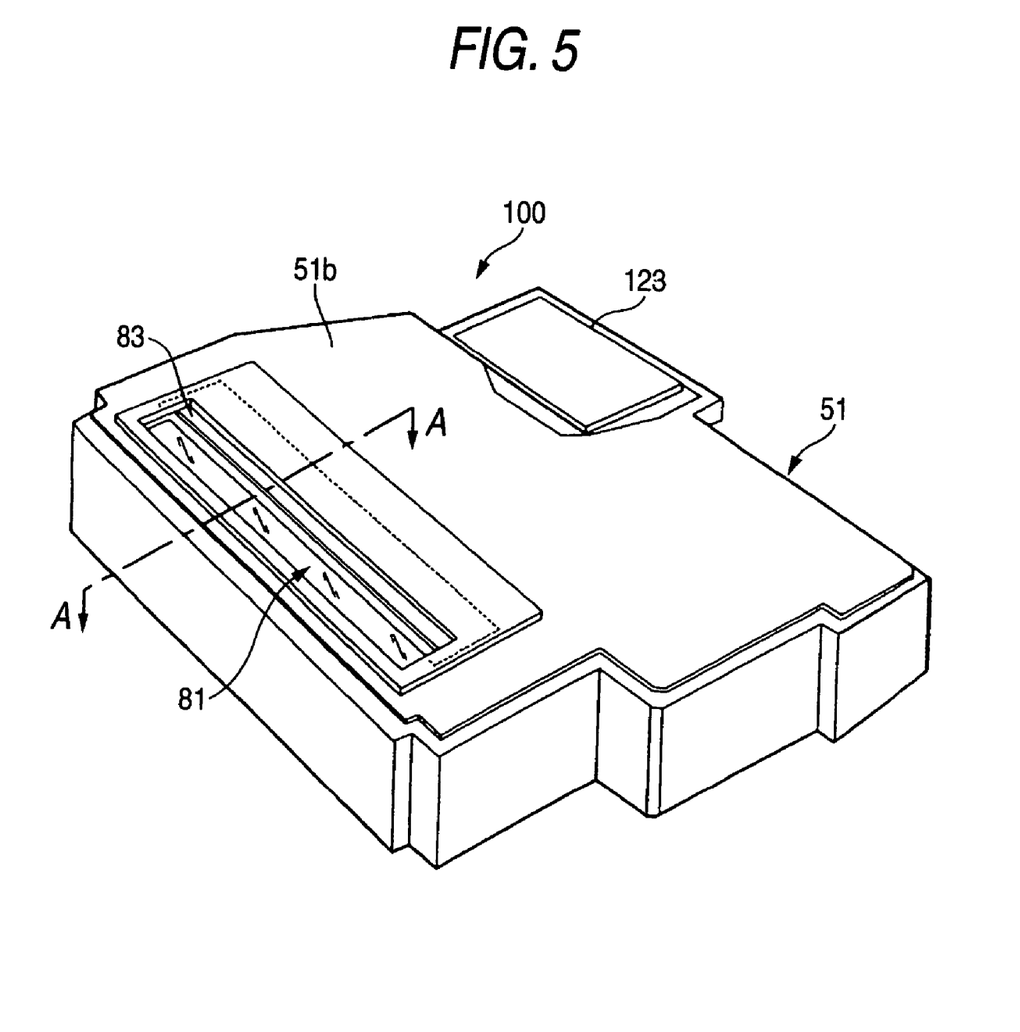
FIG. 5 is a perspective view of an optical flat to show the optical flat upside down.

FIG. 5 is a perspective view to show the optical flat upside down. FIGS. 6A and 6B are sectional views taken on line A-A in FIG. 5; FIG. 6A is a sectional view to show a state in which the light emission section is closed by the shutter and FIG. 6B is a sectional view to show a state in which the shutter is open, allowing a laser beam to be emitted from the light emission section.

Figure 6A:
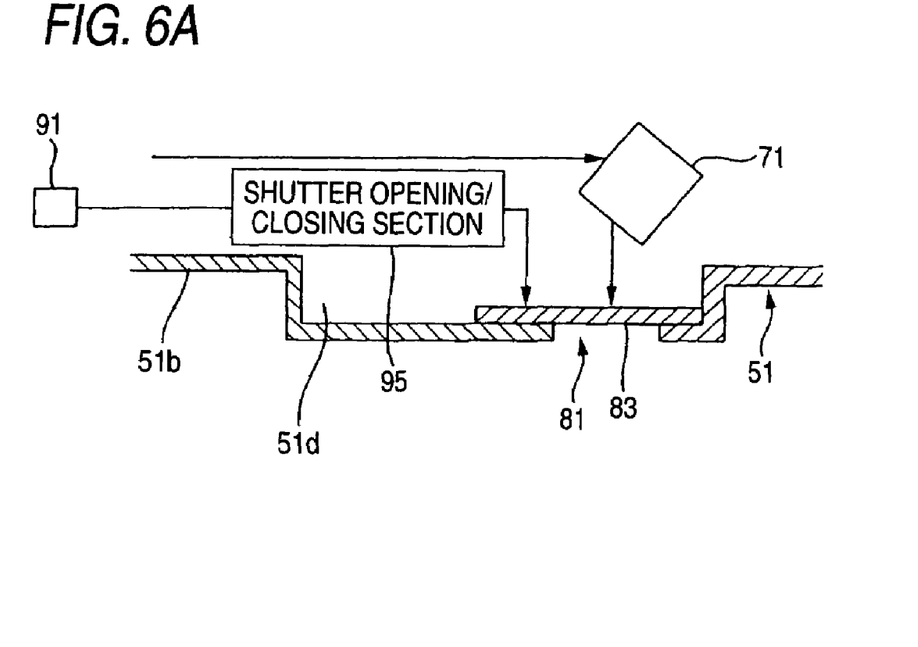
FIG. 6A is a sectional view taken on line A-A in FIG. 5 to show a state in which a light emission section is closed by a shutter.
Figure 6B:
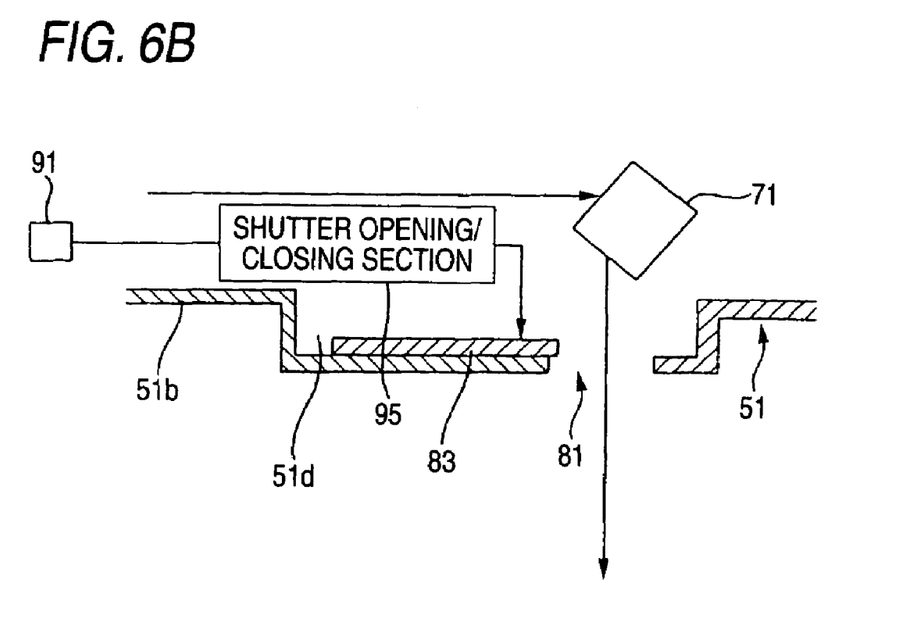
FIG. 6B is a sectional view taken on line A-A in FIG. 5 to show a state in which the shutter is open, allowing a laser beam to be emitted from the light emission section.

The shutter 83 is placed on an opening of the light emission section 81 formed at the bottom of the cabinet 51 so as to open and close the opening, as shown in FIGS. 5 and 6. The opening width of the light emission section 81 in the main scanning direction thereof is set longer than the full length of scanning the laser beam. The opening width in the direction orthogonal to the main scanning direction (subscanning direction) maybe larger than the beam diameter of the laser beam and is determined appropriately by placement of the shutter opening/closing mechanism, etc.

A concave part 51d shaped roughly like a rectangle is formed in the inside of the bottom of the cabinet 51 and a part of the concave part 51d is broken like a slit where the light emission section 81 is provided. The shutter 83 is, for example, a slide shutter disposed slidably along the bottom in the concave part 51d and opens and closes the opening of the light emission section 81. It is desirable that packing (not shown) should be disposed fully on the opening margin of the opening and the optical flat 100 should be hermetically sealed when the shutter 83 is closed. The opening and closing operation of the shutter 83 is driven by the shutter opening/closing section 95 of a motor, a solenoid, etc., controlled by the control section 91 (see FIG. 2). An elastic body such as a spring for always urging the shutter 83 in the closing direction of the shutter 83 is disposed in the shutter 83, and usually the shutter 83 is closed by the action of the elastic body. The shutter 83 may be made able to be opened and closed by manual operation.

Figure 7:
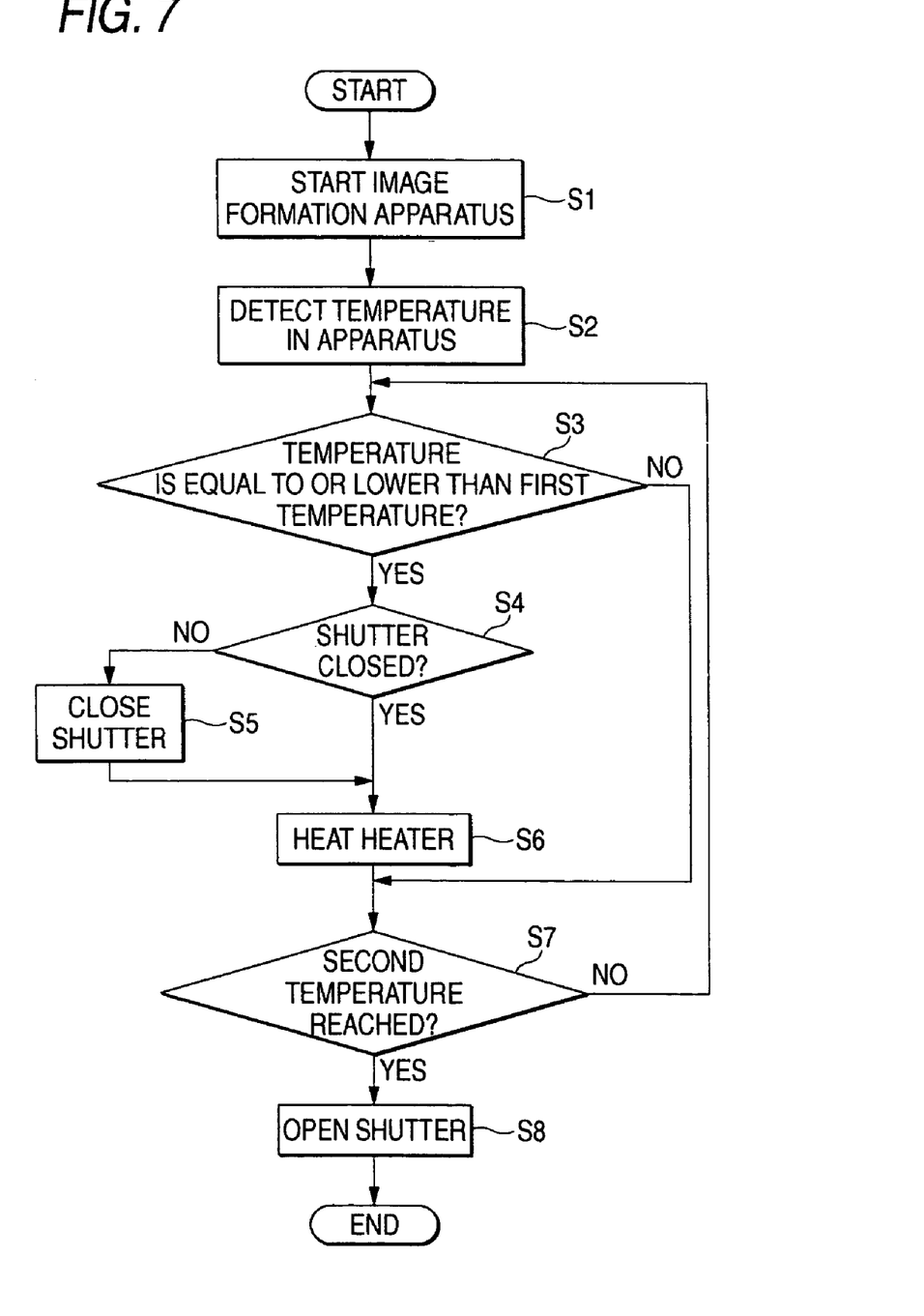
FIG. 7 is a flowchart to show a control procedure of the heating section and the shutter.

The image formation apparatus 150 has the configuration as described above. As shown in FIG. 7, when the main power switch of the image formation apparatus 150 is turned on and the image formation apparatus 150 is started (step 1 (S1)), the temperature in the optical flat 100 is detected by the temperature sensor 73 (S2) and whether or not the temperature in the optical flat 100 is equal to or lower than a predetermined temperature (first temperature) is determined (S3). If it is determined at S3 that the temperature is equal to or lower than the predetermined temperature, whether or not the shutter is closed is determined (S4). If the shutter is not closed, the control section 91 sends a shutter closing signal to the shutter opening/closing section 95 and the light emission section 81 is closed by the shutter 83 (S5) (see FIG. 6A). If the shutter is closed, the heater drive section 93 energizes the heating section 123 for heating based on a command signal from the control section 91 (S6) and whether or not the temperature in the optical flat 100 reaches a stipulated temperature (second temperature) is determined by the temperature sensor 73 (S7). Here, the second temperature is equal to or more than the first temperature.

On the other hand, if it is not determined at S3 that the temperature in the optical flat 100 is equal to or lower than the predetermined temperature (first temperature), whether or not the temperature in the optical flat 100 reaches the stipulated temperature (second temperature) is determined by the temperature sensor 73 (S7). If it is not determined that the temperature reaches the second temperature, the process returns to S2 for detecting the temperature in the optical flat 100. Here, the temperature in the optical flat 100 is increasing due to heat generated by staring the image formation apparatus (for example, heat from the thermal developing section C). If it is determined that the temperature reaches the second temperature, the control section 91 sends a shutter opening signal to the shutter opening/closing section 95 for operating the shutter 83 to open the light emission section 81 (S8), allowing a laser beam to be emitted from the light emission section 81 to the thermal development record material 3 (see FIG. 6B).

The predetermined temperature (first temperature) set here is a temperature at which the inside of the optical flat 100 does not become the dew-point temperature; it is about 10° C. by experiment of the inventor.

When the internal temperature of the optical flat 100 is equal to or less than the predetermined temperature, the shutter 83 is operated for hermetically sealing the optical flat 100 and then the polygon mirror 63 is heated by the heating section 123, as described above. Accordingly, first the polygon mirror 63 is heated for preventing condensation and the inside of the optical flat 100 also rises gradually and reaches the predetermined temperature, enabling the image formation apparatus 150 to be started up. When the polygon mirror 63 is heated, the optical flat 100 is hermetically sealed by the shutter 83, so that the temperature in the optical flat 100 can be raised efficiently in a short time and condensation in the optical system can be prevented.

Since the heating section 123 is placed on the outer side of the optical flat 100, heat is also radiated to the outside of the optical flat 100, also contributing to the temperature rise in the whole image formation apparatus 150. The temperature in the optical flat 100 rises due to heat generation from the polygon mirror 63 for reliably preventing condensation in each section during the operation of the image formation apparatus 150. After the steady operation state is reached, the heat amount from the polygon mirror 63 is also absorbed in the heating section 123 placed in a non-energization state and is radiated to the outside, preventing an excessive rise in the temperature in the optical flat 100. Therefore, the heat capacity of the heating section 123 is enhanced, so that the heating section 123 functions as an effective radiation member.

To provide a stable image, it is necessary to make uniform the temperatures of the plate heaters 31a, 31b, and 31c and the plurality of press rollers 35 of the thermal developing section C, etc.; it is effective to promote heating the members by raising the ambient temperature rather than heating of a heater installed nearby.

The image formation apparatus 150 of the embodiment is the image formation apparatus 150 for causing the optical flat 100 housing the scanning optical system containing the light deflection section 63 in the cabinet 51 to emit light scanned by the light deflection section 63 and forming an image by the scanned light, and includes the heating section 123 being placed on the outer side 51b of the cabinet 51 for heating the optical flat 100. Thus, the scanning optical system containing the light deflection section 63 is heated for preventing condensation in the scanning optical system and at the same time, air in the image formation apparatus 150 is warmed for contributing to heating other parts (for example, the thermal developing section C), and it is made possible to start up the image formation apparatus in a short time.

According to the image formation apparatus 150 of the embodiment, the heating section 123 that heats the light deflection section 63 is placed on the outer side 51b at the position where the light deflection section 63 is placed in the cabinet 51. Thus, first, while the light deflection section 63 is heated for preventing condensation, the image formation apparatus 150 is started up. Heating other parts is also promoted by heat generated from the light deflection section 63. Consequently, the image formation apparatus 150 can be started up in a short time. Further, when the image formation apparatus 150 operates, the heat generated from the light deflection section 63 can be radiated to the outside through the heating section 123 placed in a non-heat state for preventing an excessive rise in the temperature in the cabinet 51.

Further, according to the image formation apparatus 150 of the embodiment, the light emission section 81 that emits scan light from the scanning optical system to the outside of the cabinet 51 is covered with the shutter 83 so that it can be opened and closed by the shutter. Thus, usually the shutter 83 can be closed, thereby preventing a foreign material entering the optical flat 100 from the outside and protecting the scanning optical system containing the light deflection section 63 for forming a good image.

According to the image formation apparatus 150 of the embodiment, if the shutter 83 is closed, it hermetically seals the inside of the cabinet 51, so that the hermetically sealed optical flat 100 is heated, whereby the inside of the cabinet can be warmed efficiently, condensation can be prevented reliably, and the start-up time can also be shorted.

Further, the image formation apparatus 150 of the embodiment includes the temperature sensor 73 that measures the temperature in the cabinet 51 and the control section 91 that operates the heating section 123 to heat the optical flat 100 if the temperature detection value of the temperature sensor 73 is equal to or less than the predetermined temperature. Thus, if the temperature in the cabinet 51 is equal to or less than the predetermined temperature (first temperature) at which there is a fear of condensation, the optical flat 100 can be heated by the heating section 123 for reliably preventing condensation.

The image formation apparatus 150 of the embodiment includes the temperature sensor 73 that measures the temperature in the cabinet 51 and the control section 91 that operates the shutter 83 to be closed if the temperature detection value of the temperature sensor 73 is equal to or less than the predetermined temperature (first temperature) and operates the shutter 83 to be opened if the temperature detection value is equal to or more than the stipulated temperature (second temperature). Thus, if the temperature in the cabinet is equal to or less than the predetermined temperature at which there is a fear of condensation, the shutter 83 is closed for hermetically sealing the cabinet 51 and then the optical flat 100 is heated by the heating section 123. If the temperature in the cabinet 51 is equal to or more than the stipulated temperature, the shutter 83 is opened, allowing the scan light from the scanning optical system to be emitted from the light emission section 81 to the outside of the cabinet 51, and condensation in the optical flat 100 can be prevented and the effect of condensation of the light emission section 81 can be eliminated for forming a stable image.

According to the image formation apparatus of the invention, condensation in the optical flat is reliably prevented and a good image is formed and it is made possible to start up the image formation apparatus in a short time.

The entire disclosure of each and every foreign patent application from which the benefit of foreign priority has been claimed in the present application is incorporated herein by reference, as if fully set forth.

What is claimed is:

1. An image formation apparatus which comprises an optical flat including: a cabinet; and a scanning optical system containing a light deflection section, the scanning optical system being housed inside the cabinet, so as to emit light scanned by the light deflection section and form an image by the scanned light; a light emission section that emits scan light from the scanning optical system to an outside of the cabinet; and a shutter by which the light emission section can be opened and closed;
    wherein the image formation apparatus further comprises a heating section being placed on an outer side of the cabinet to heat the optical flat;
    a temperature sensor that measures the temperature in the cabinet; and
    a control section that operates the shutter to be closed when a temperature detection value of the temperature sensor is equal to or less than a first temperature and operates the shutter to be opened when the temperature detection value is equal to or more than a second temperature, the second temperature being equal to or more than the first temperature.

2. An image formation apparatus which comprises an optical flat including: a cabinet; a scanning optical system containing a light deflection section, the scanning optical system being housed inside the cabinet, so as to emit light scanned by the light deflection section and form an image by the scanned light; a light emission section that emits scan light from the scanning optical system; and a shutter;
    wherein the image formation apparatus further comprises a heating section being placed on an outer side of the cabinet to heat the optical flat;
    a temperature sensor; and
    a control section that operates the shutter to be closed when a temperature detection value of the temperature sensor is equal to or less than a first temperature and operates the shutter to be opened when the temperature detection value is equal to or more than a second temperature, the second temperature being equal to or more than the first temperature.

* * * * *